United States Patent [19]

Wegeng et al.

[11] Patent Number: 5,528,375
[45] Date of Patent: Jun. 18, 1996

[54] APPARATUS FOR AND METHOD OF SCHEDULING AND PRINTING A JOB IN A PRINTING MACHINE

[75] Inventors: Donald L. Wegeng, Rochester; Gregory C. Sosinski, Fairport; Douglas F. Sundquist, Webster, all of N.Y.

[73] Assignee: Xerox Corporation, Stamford, Conn.

[21] Appl. No.: 230,458

[22] Filed: Apr. 20, 1994

[51] Int. Cl.⁶ .................................................. G06K 15/00
[52] U.S. Cl. .......................... 358/296; 355/319; 395/155; 395/164; 395/166
[58] Field of Search ............................ 358/296; 355/308, 355/319; 395/200, 115, 162, 163, 164, 165, 166, 425

[56] References Cited

U.S. PATENT DOCUMENTS

| | | | |
|---|---|---|---|
| 4,190,350 | 2/1980 | Donohue et al. | 355/14 R |
| 4,454,575 | 6/1984 | Bushaw et al. | 364/200 |
| 4,910,607 | 3/1990 | Kita et al. | 358/400 |
| 4,947,345 | 8/1990 | Paradise et al. | 364/519 |
| 5,016,114 | 5/1991 | Sakata et al. | 358/404 |
| 5,027,221 | 6/1991 | Hisatake et al. | 358/300 |
| 5,038,218 | 8/1991 | Matsumoto | 358/296 |
| 5,047,955 | 9/1991 | Shope et al. | 364/519 |
| 5,097,341 | 3/1992 | Forest | 358/296 |
| 5,142,667 | 8/1992 | Dimpeno et al. | 395/115 |
| 5,170,340 | 12/1992 | Prokop et al. | 364/143 |
| 5,184,185 | 2/1993 | Rasmussen et al. | 355/308 |
| 5,223,948 | 6/1993 | Sakurai et al. | 358/404 |
| 5,243,381 | 9/1993 | Hube | 355/204 |
| 5,261,047 | 11/1993 | Rivshin | 395/163 |
| 5,276,799 | 1/1994 | Rivshin | 395/162 |
| 5,359,713 | 10/1994 | Moram et al. | 395/200 |

Primary Examiner—John E. Barlow, Jr.
Attorney, Agent, or Firm—Gary B. Cohen

[57] ABSTRACT

A method is provided for printing a job in a printing system including a printer communicating with a memory section, wherein images, in the form of image data, are transmitted to the memory section, from an input source, for use in printing the job and the printing of the job is facilitated by a print processor. The method includes the steps of building a scheduling list, indicating an order in which images of the job are to be printed, and storing the scheduling list in a location that is accessible to the print processor. The method further includes the steps of retrieving an image from the input source, with the print processor, by referring to information in the stored scheduling list and providing an indication, in the scheduling list, when the image is resident in the memory section. Upon determining that the indication has been provided, a print is produced with a copy of the image. In practice, the steps of retrieving the image and determining that the indication has been provided are executed with the print processor.

7 Claims, 14 Drawing Sheets

APPARATUS FOR AND METHOD OF SCHEDULING AND PRINTING A JOB IN A PRINTING MACHINE

The present invention relates generally to printing a job in a printing machine and more particularly to a technique in which two processes are executed on a single controller to provide a simplified, yet effective methodology in which the processes execute respective functions, with respect to the job, by reference to a centrally located scheduling list.

It is now well accepted that electronic reprographic systems, such as Canon's NP-9030 digital copying apparatus, have certain distinct advantages over known light-lens systems. The NP-9030 was one of the first electronic reprographic systems to be marketed with the capability to convert an optical image from a scanned original to image intensity signals, and reconstruct the signals, by way of a print engine using a pulsed diode laser. Because of the many image processing capabilities of the electronic reprographic system, which allows for, among other things, cut and paste operations, these types of systems are gaining immensely in popularity. While the NP-9030 was, when first introduced, a revolutionary product, it can no longer keep pace with advancements in the art, many of which are spurred on by advancements in related art areas, such as facsimile and computer.

Advancements in the area of digital design has had a profound effect on the design of electronic reprographic systems. Indeed, in 1990, Xerox launched an electronic reprographic system, known as the DocuTech® printing system, that should serve as a benchmark in the area of electronic reprographics for many years to come. One of the distinguishing features of the DocuTech® printing system resides in its architecture which includes a plurality of virtual machines or services. An example of this architecture can be found in the following patent:

U.S. Pat. No. 5,170,340

Patentees: Prokop et al.

Issued: Dec. 8, 1992

In systems such as the DocuTech®, documents are introduced at an image input terminal (IIT) by way of, for example, a scanner or a network connection, processed, for printing, with an electronic sub-system (ESS) and stored, in the form of image data, in permanent memory pending printing, editing or later use. For purposes of printing, the image data is retrieved from permanent memory and marked at an image output terminal (IOT). In practice, the DocuTech® uses multiple managers or controllers, to insure that image data is transferred to substrates in a timely manner. In particular, a first manager facilitates the fetching of image data from memory and a second manager coordinates the feeding of substrates in the IOT with the fetching of the image data. Other patents which relate respectively to electronic reprographic machines that use multiple controllers include:

U.S. Pat. No. 4,190,350

Patentees: Donohue et al.

Issued: Feb. 26, 1980

U.S. Pat. No. 4,910,607

Patentees: Kita et al.

Issued: Mar. 20, 1990

U.S. Pat. No. 5,276,799

Patentee: Rivshin

Issued: Jan. 4, 1994

Various electronic reprographic machines use just one manager to control various machine functions. Examples of such machines include:

U.S. Pat. No. 4,454,575

Patentees: Bushaw et al.

Issued: Jun. 12, 1984

U.S. Pat. No. 4,947,345

Patentees: Paradise et al.

Issued: Aug. 7, 1990

U.S. Pat. No. 5,016,114

Patentees: Sakata et al.

Issued: May 14, 1991

U.S. Pat. No. 5,027,221

Patentees: Hisatake et al.

issued: Jun. 25, 1991

U.S. Pat. No. 5,038,218

Patentee: Matsumoto

Issued: Aug. 6, 1991

U.S. Pat. No. 5,047,955

Patentees: Shope et al.

Issued: Sep. 10, 1991

U.S. Pat. No. 5,097,341

Patentee: Forest

Issued: Mar. 17, 1992

U.S. Pat. No. 5,223,948

Patentees: Sakurai et al.

Issued: Jun. 29, 1993

U.S. Pat. No. 5,261,047

Patentee: Rivshin

Issued: Nov. 9, 1993

While the above-mentioned single manager systems possess certain advantages, relative to the DocuTech® printing system, in that they are relatively inexpensive and have a straightforward design, they lack some of the advanced functionality associated with the DocuTech®. For example, as indicated above, in the DocuTech® printing system, one manager facilitates the fetching of image data while another manager coordinates the feeding of substrates in the IOT. It is believed that none of the patents representing the above-mentioned single manager systems disclose this capability. Even though using two managers, to respectively manage data transfer and marking, represents a suitable manner to printing image data in an electronic reprographic machine, it would be desirable to provide a single manager system in which similar capability could be obtained.

In accordance with one aspect of the disclosed invention there is provided a method for printing a job in a printing system including a printer communicating with a memory section, wherein images, in the form of image data, are transmitted to the memory section, from an input source, for use in printing the job and the printing of the job is supervised by a print manager, including the steps of: building a scheduling list indicating an order in which images of the job are to be printed; storing the scheduling list in a location that is accessible to the print manager; retrieving an image from the input source, with the print manager, by referring to information in the stored scheduling list, wherein the image is stored in the memory section; determining, by reference to the scheduling list, whether the image data is resident in memory; and transmitting a copy of the stored image data from the memory section to the printer in response to an indication, in the scheduling list, that the image data is resident in the memory section.

In accordance with another aspect of the disclosed invention there is provided a method for printing a job in a printing system including a printer communicating with a memory section, wherein images, in the form of image data, are transmitted to the memory section, from an input source, for use in printing the job and the printing of the job is facilitated by a print processor, including the steps of: building a scheduling list indicating an order in which images of the job are to be printed; storing the scheduling list in a location that is accessible to the print processor; retrieving an image from the input source, with the print processor, by referring to information in the stored scheduling list, wherein the image is stored in the memory section; providing an indication, in the scheduling list, when the image is resident in the memory section; determining whether the indication has been provided; and producing a print, with a copy of the image in response to said determining step determining that the indication has been provided, said retrieving, providing, determining and producing steps being executed with the print processor.

In accordance with yet another aspect of the disclosed invention there is provided an apparatus for printing a print job to produce one or more prints with each print including an image represented by image data, including: a scheduling list indicating an order in which images of the job are to be printed; an input source for supplying a selected image of the print job; a memory section, communicating with the input source and the scheduling list, for receiving the selected image from the input source; a printer, communicating with the memory section and the scheduling list, for producing a print corresponding to the selected image; and a print manager, communicating with the memory section, the printer and the scheduling list, including: means for managing retrieval of the image data corresponding to the selected image by reference to the scheduling list, and means for managing a transfer of the image data corresponding to the selected image by reference to the scheduling list.

These and other aspects of the invention will become apparent from the following description, the description being used to illustrate a preferred embodiment of the invention when read in conjunction with the accompanying drawings.

Figure 2:
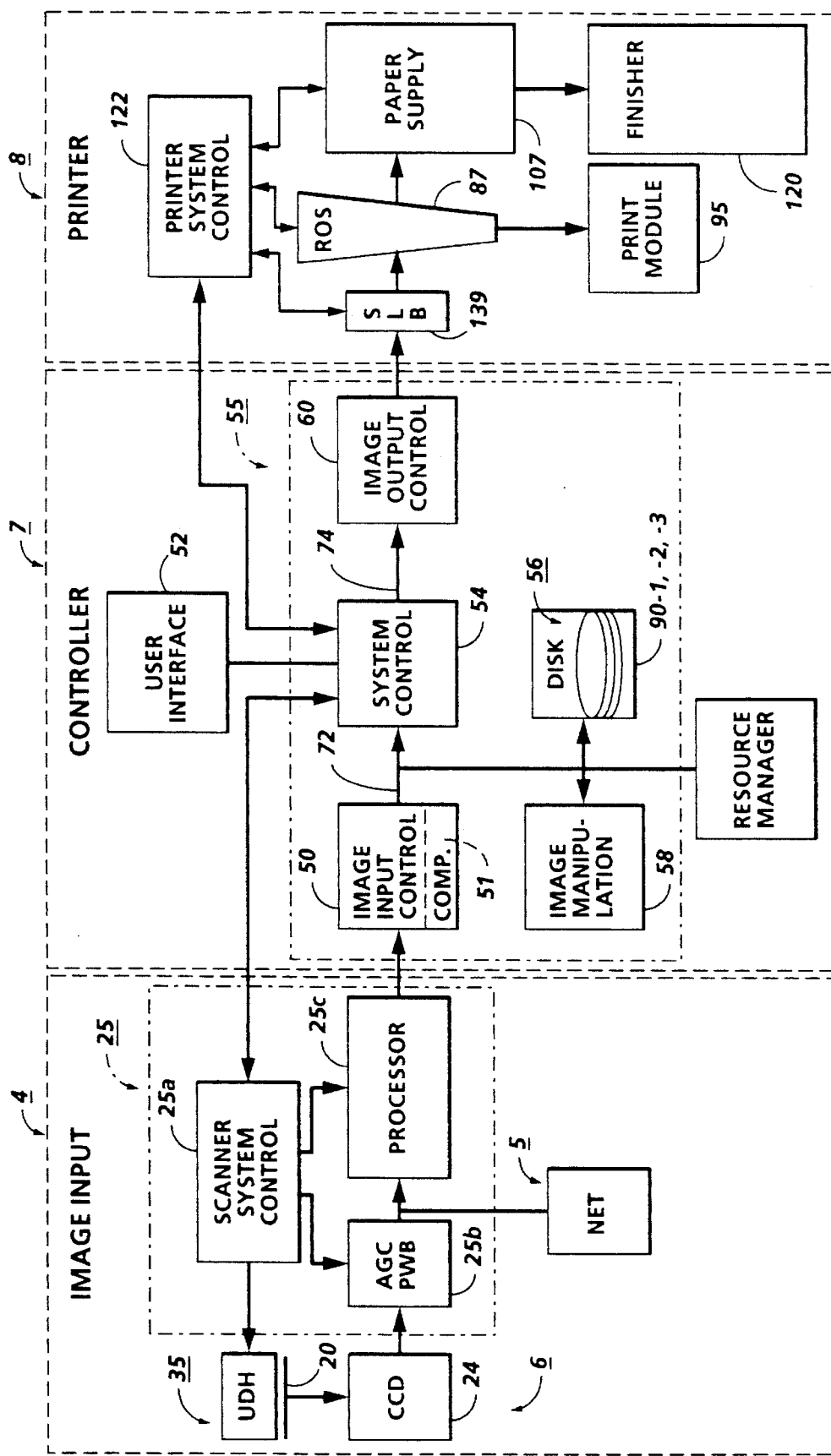
FIG. 2 is a block diagram depicting the major elements of the printing system shown in FIG. 1.
Figure 3:
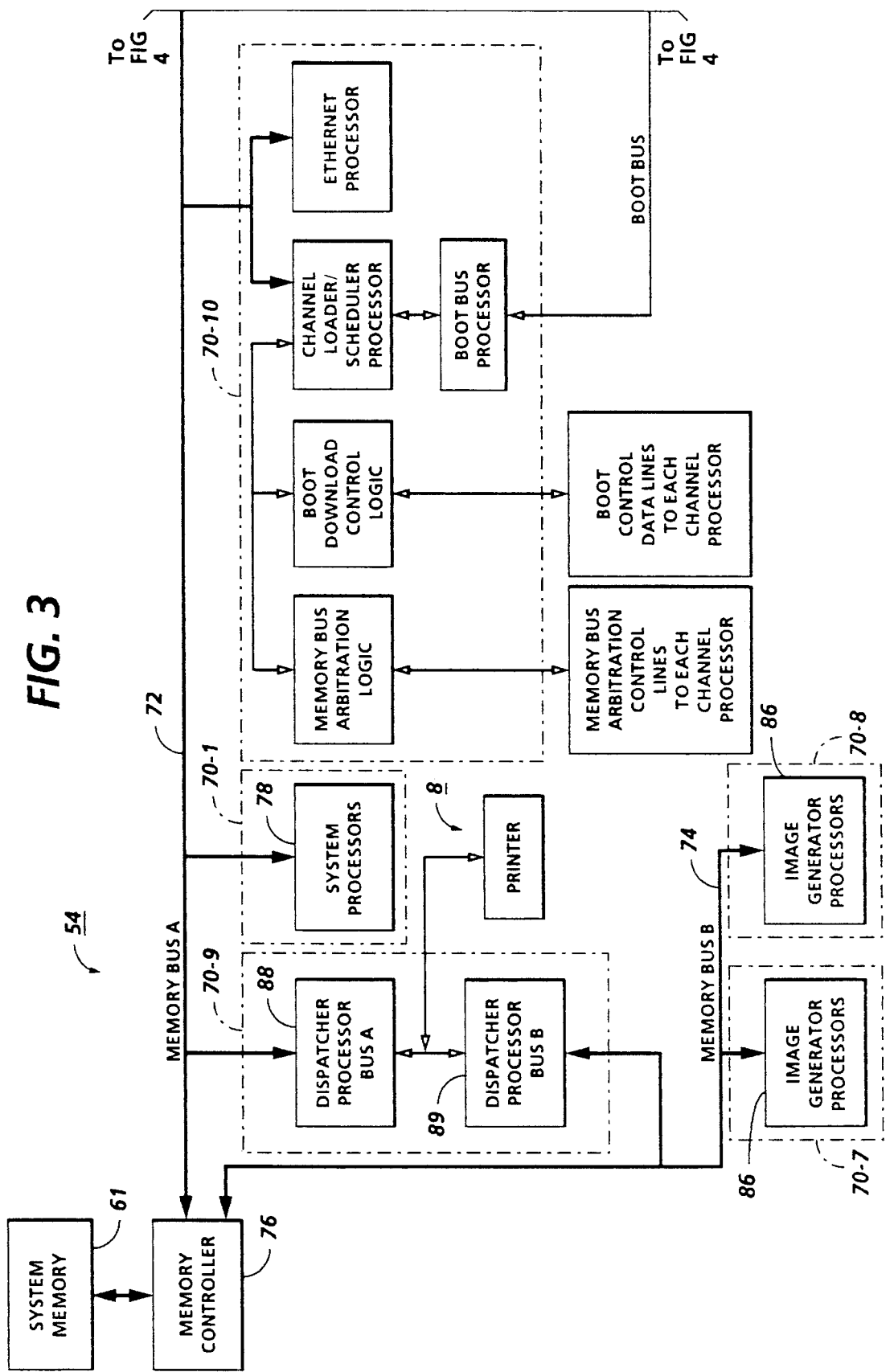
Figure 4:
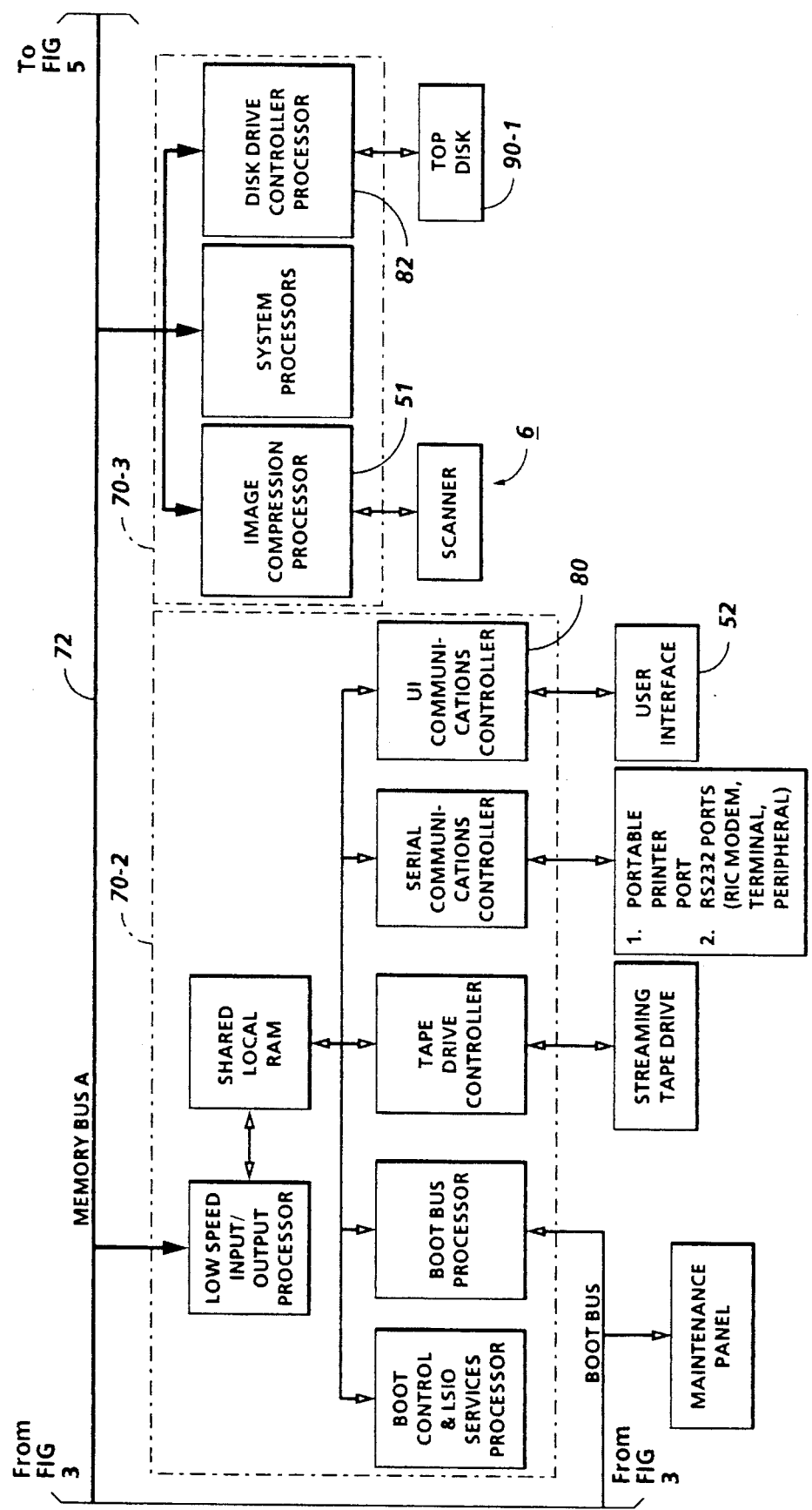
Figure 5:
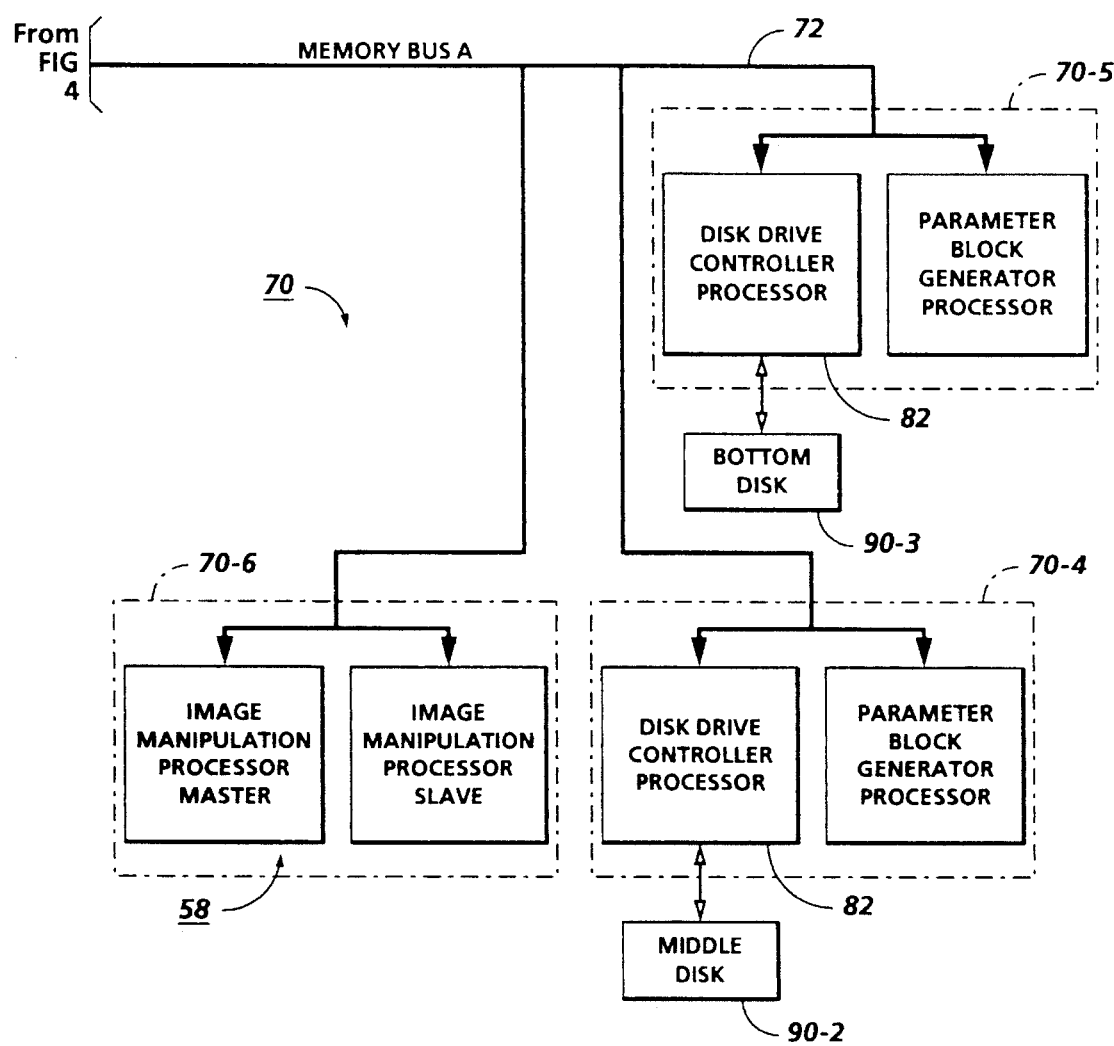
Figure 6:
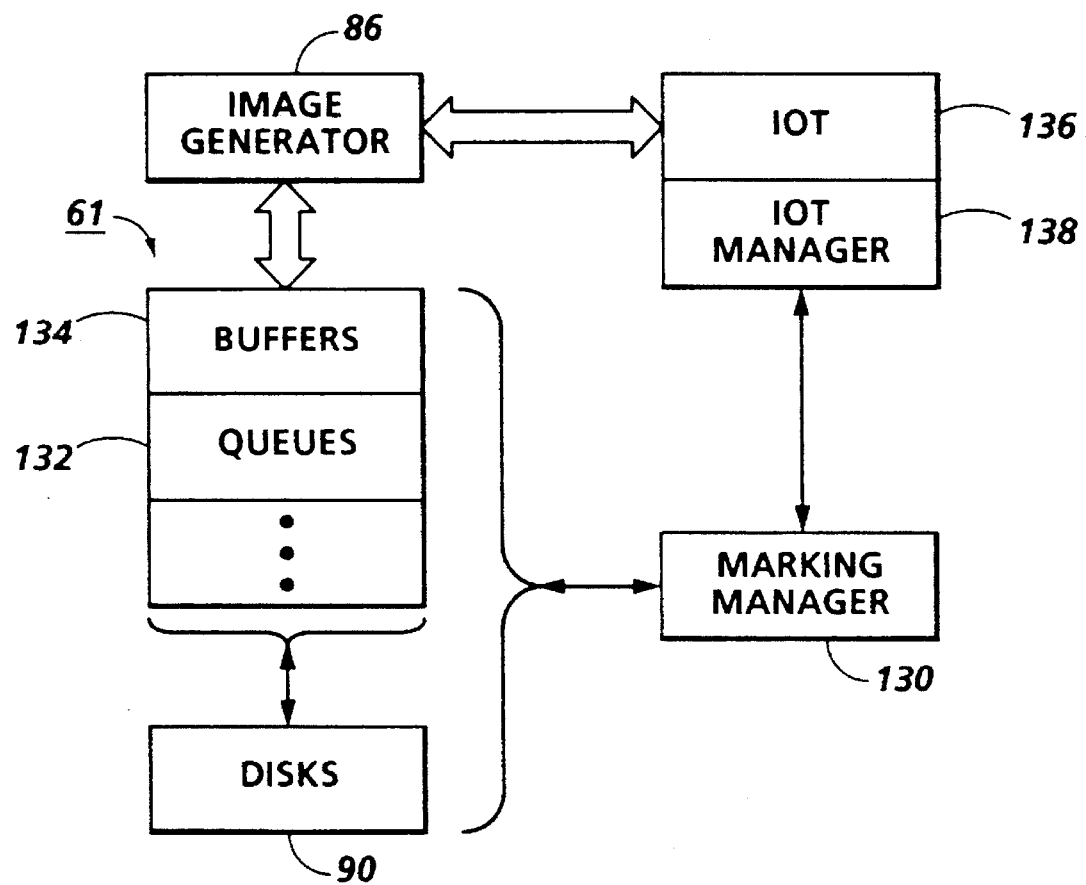
Figure 7:
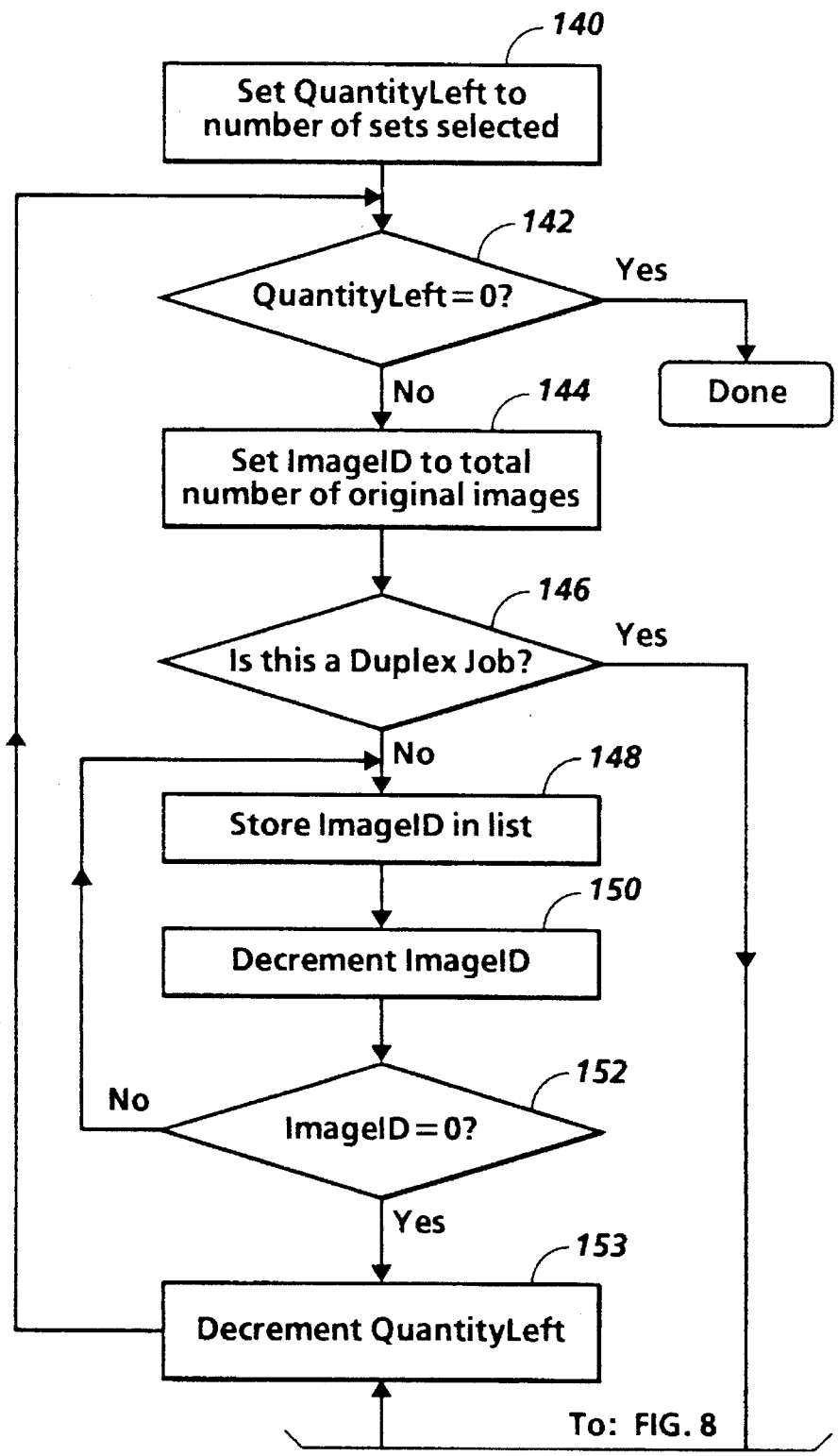
Figure 8:
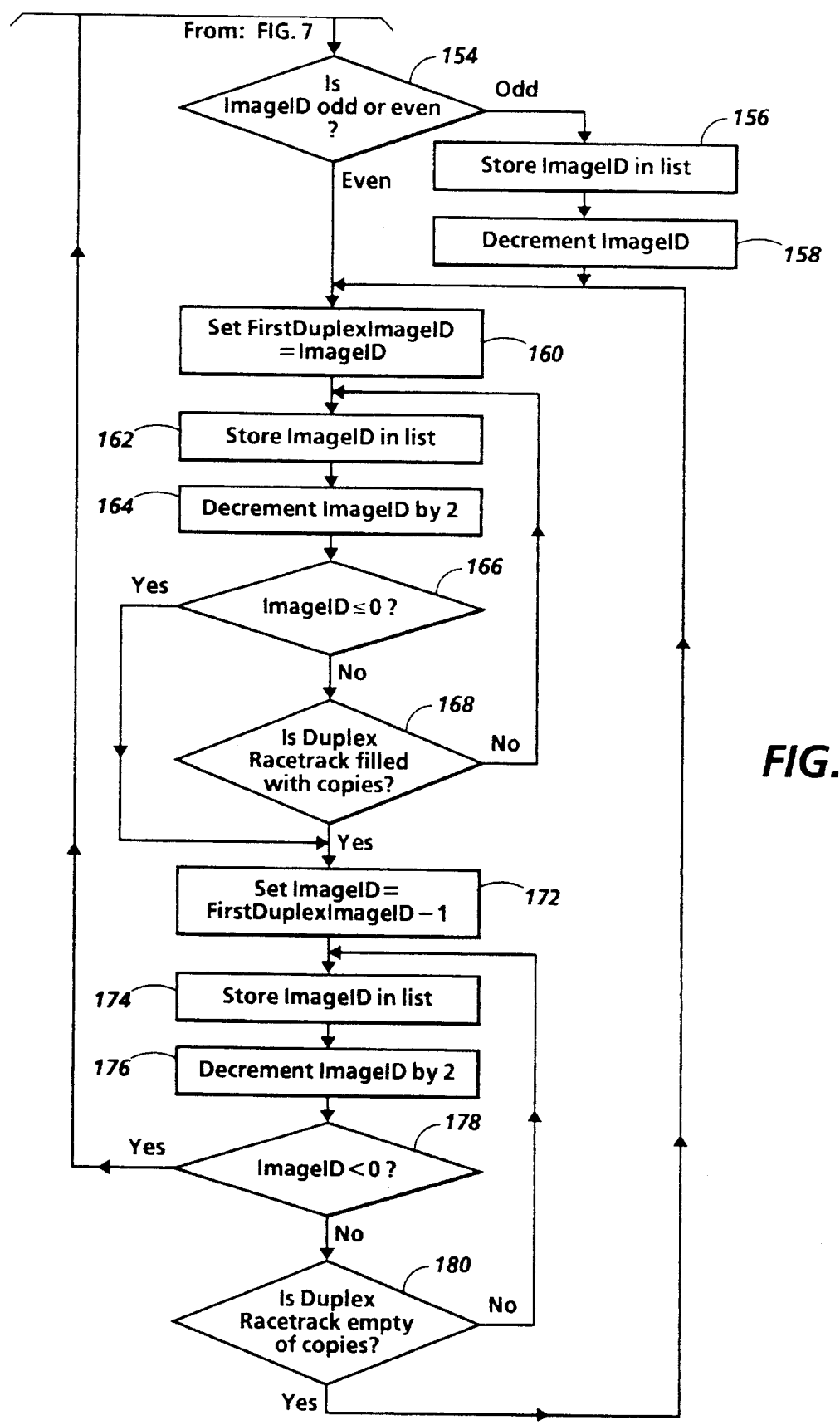
Figure 9:
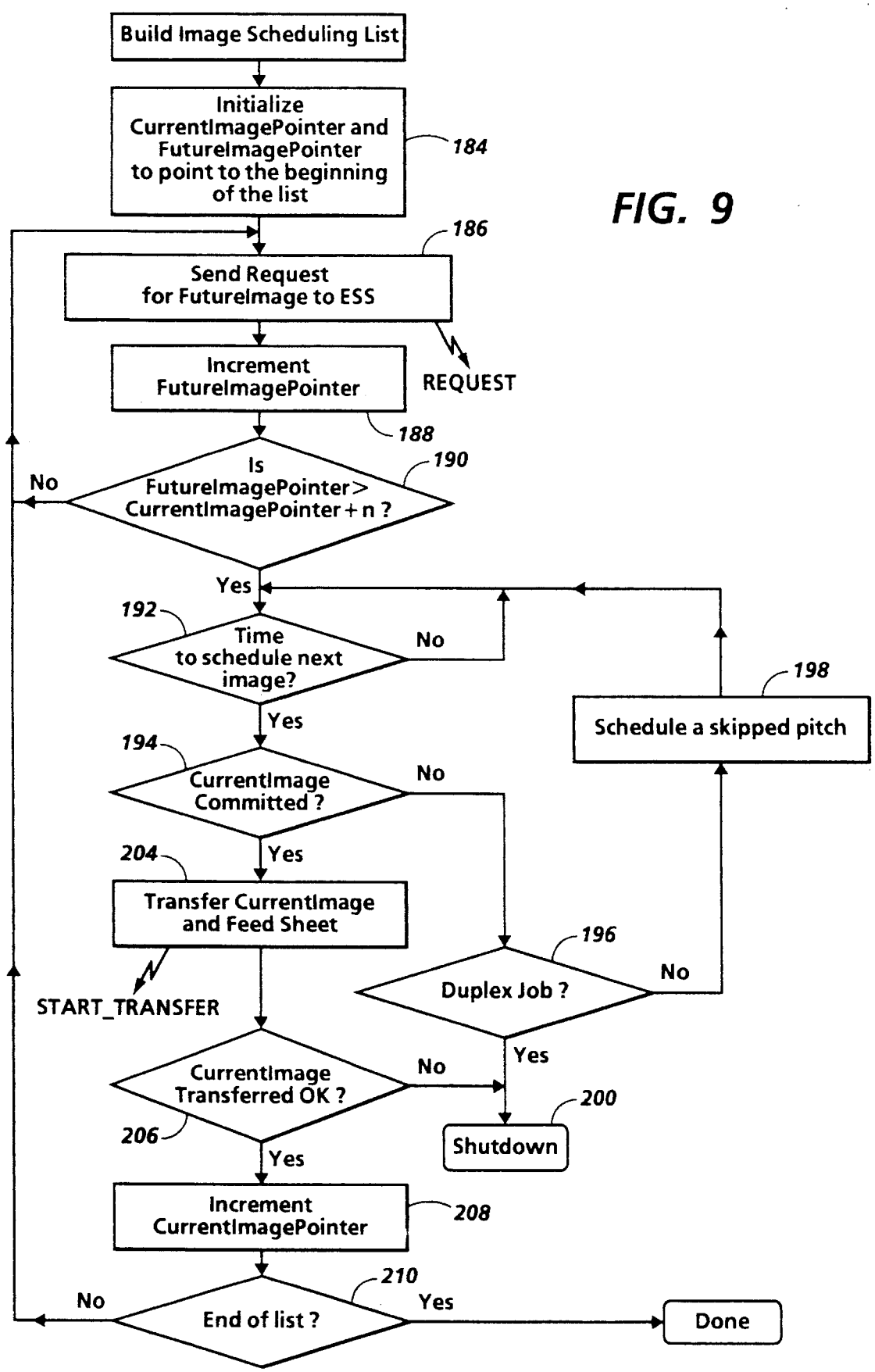
Figure 10:
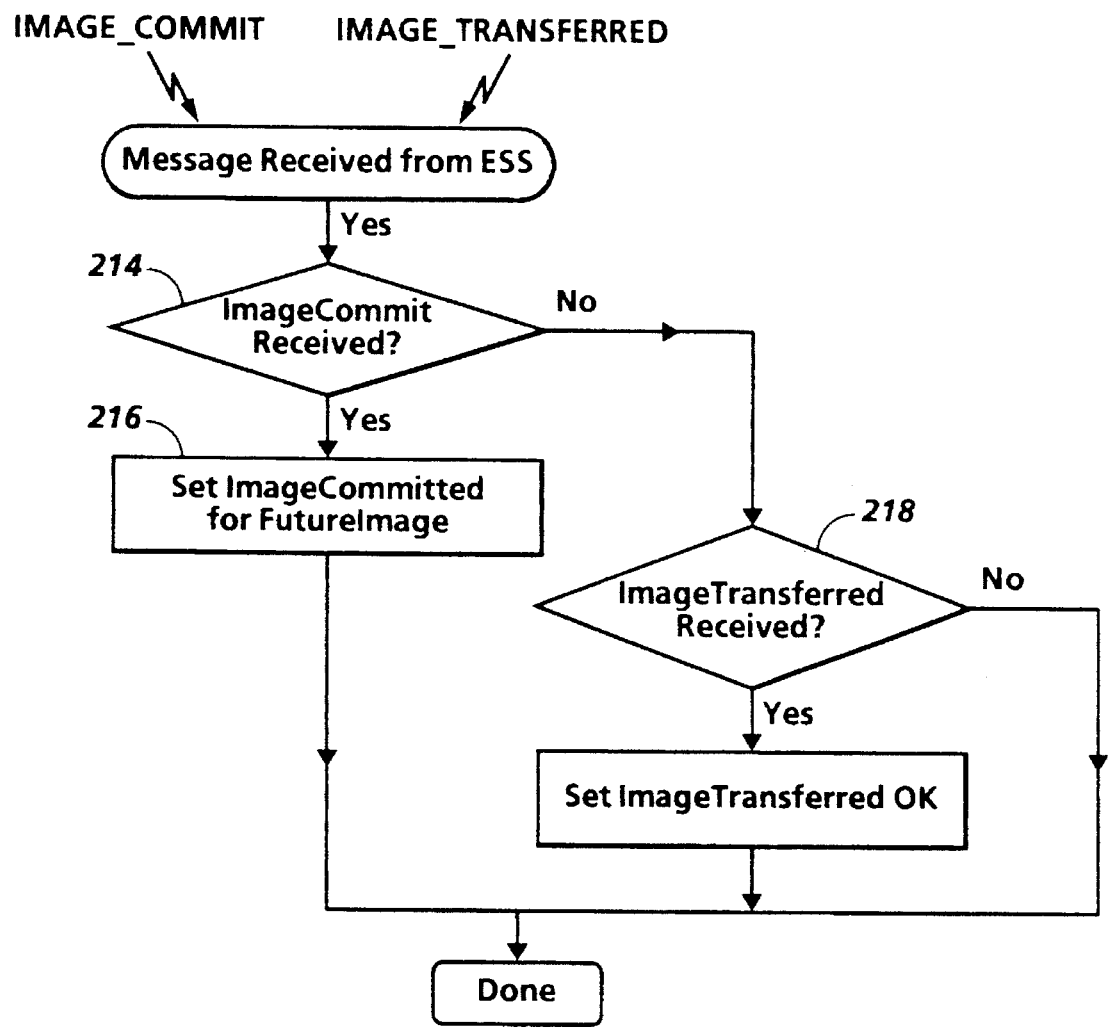
Figure 11:
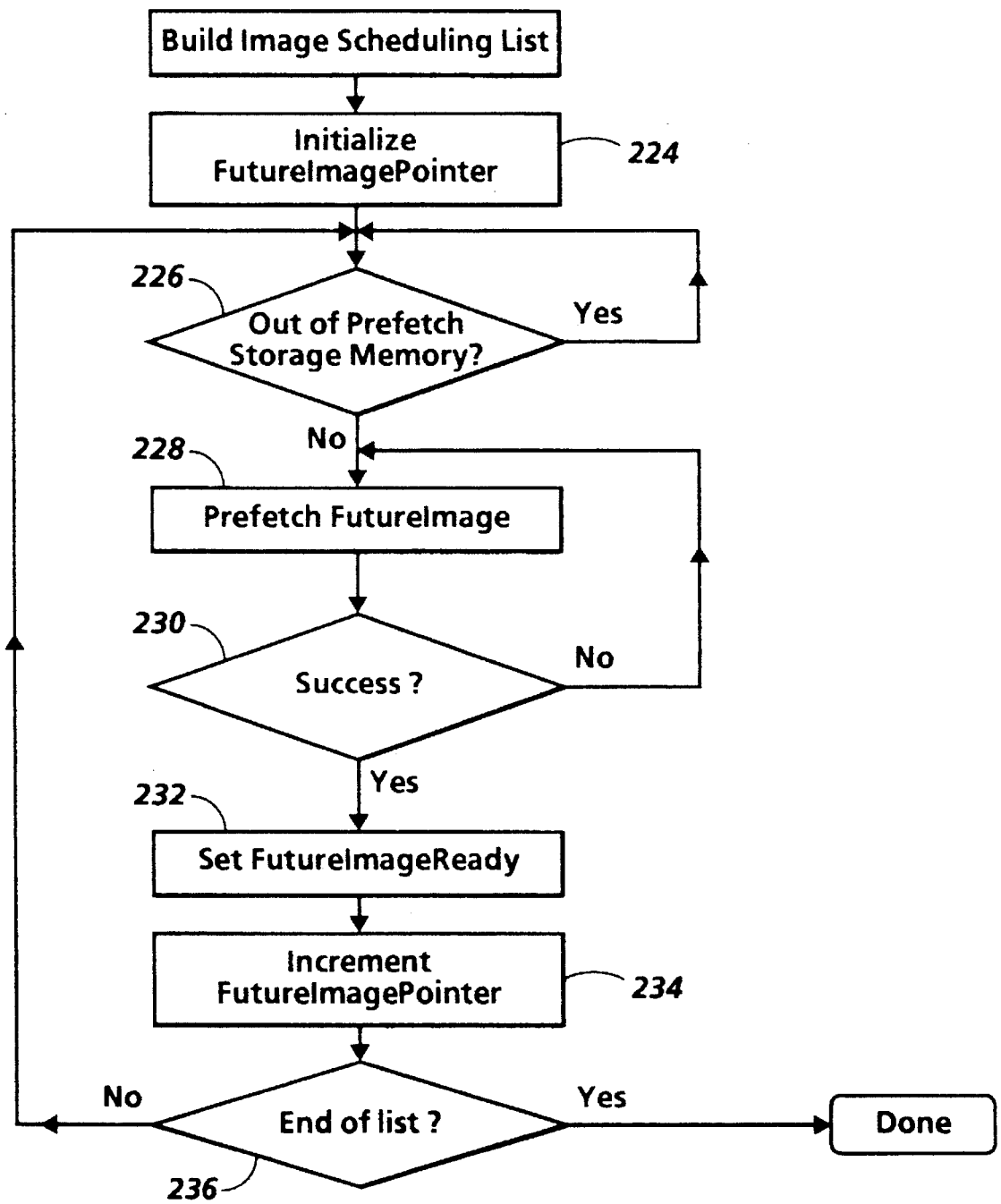
Figure 12:
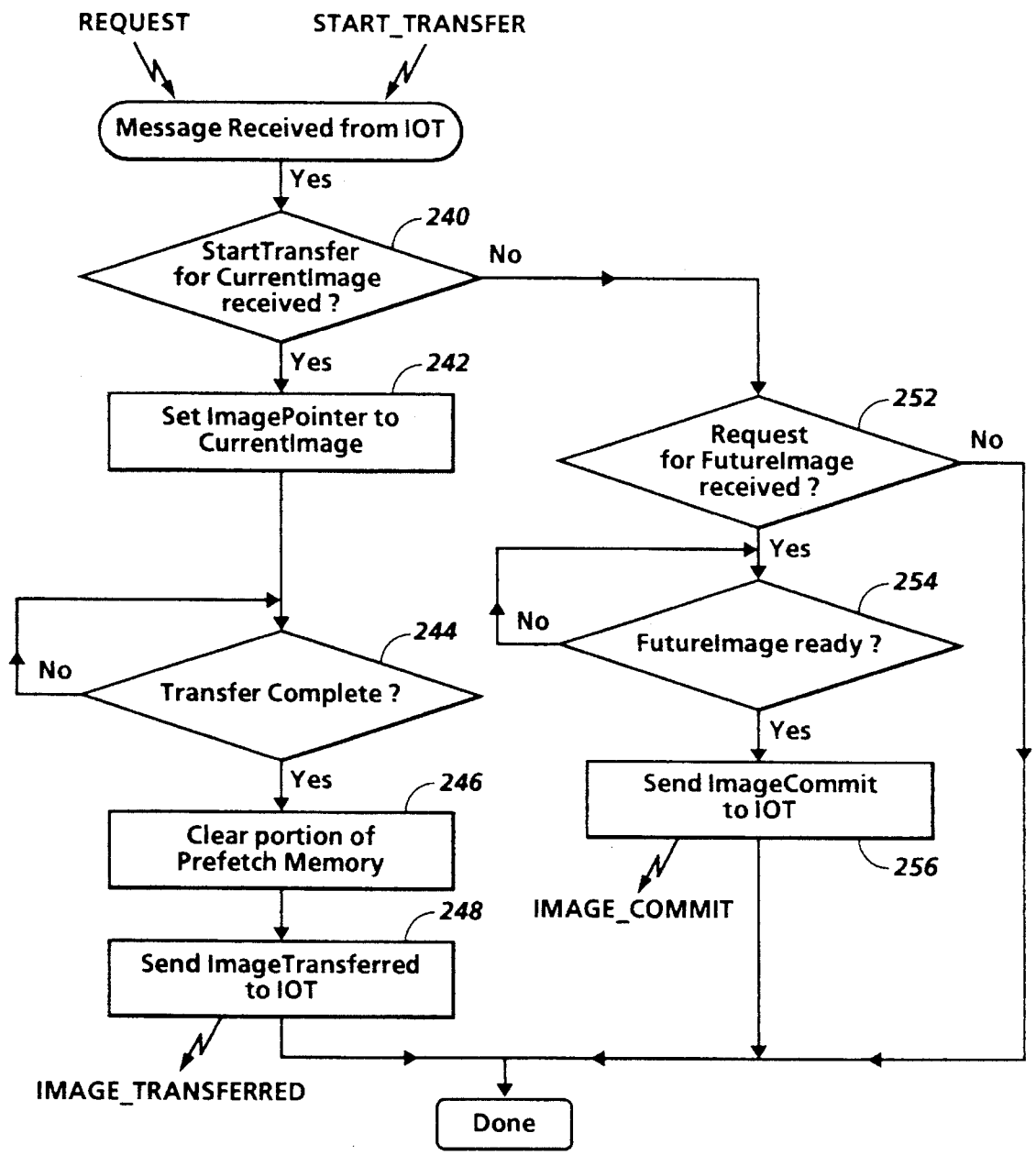
Figure 13:
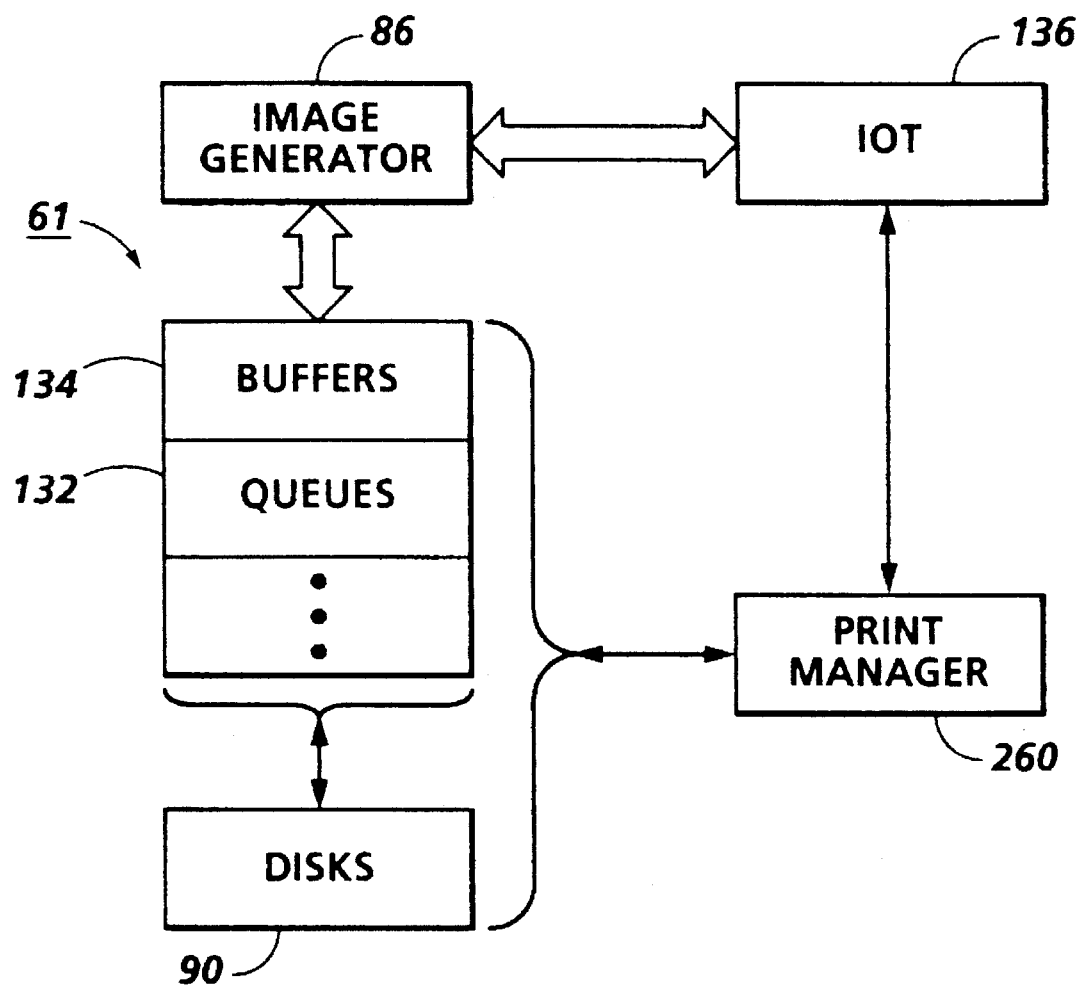
Figure 14:
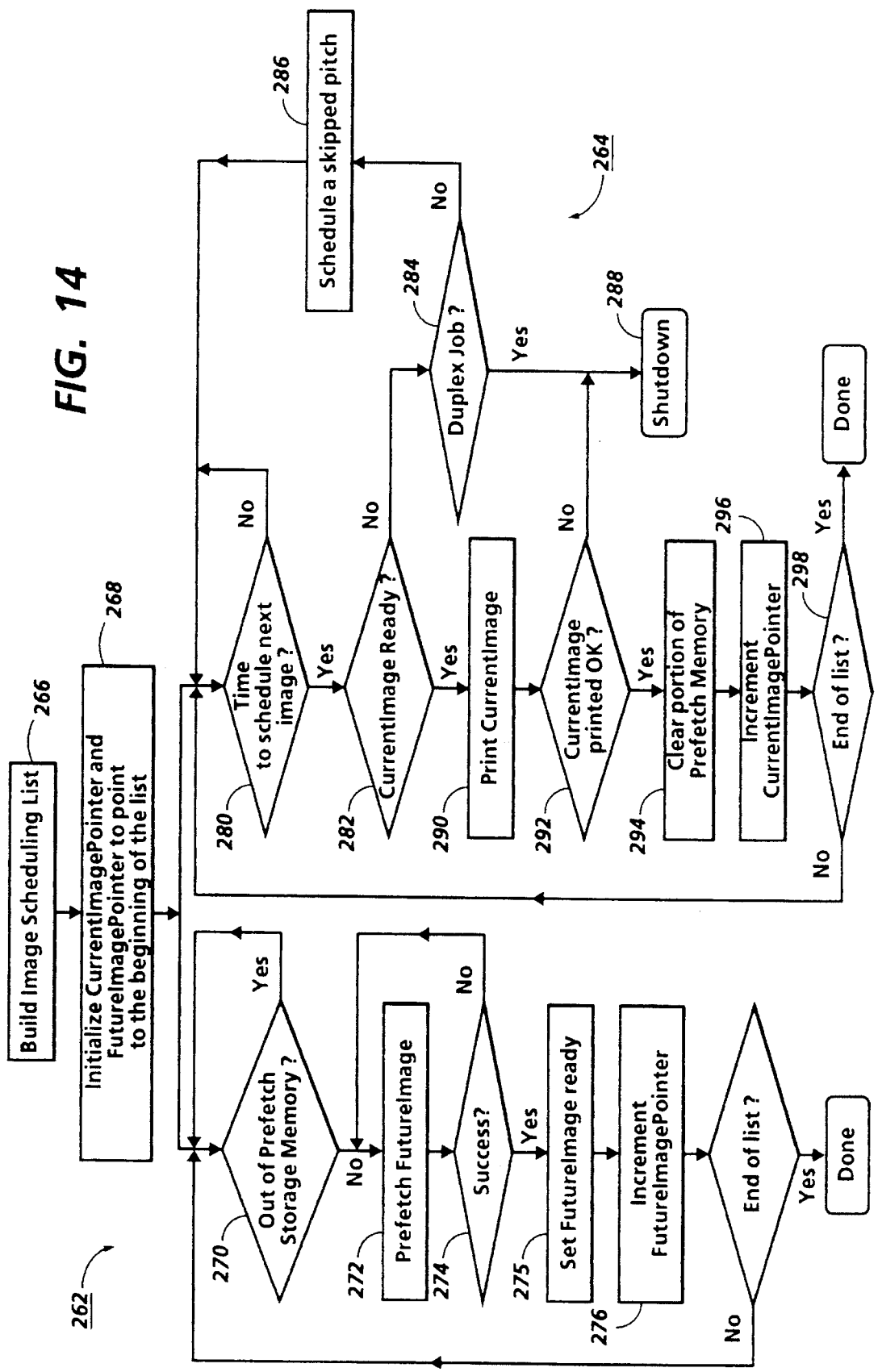

FIGS. 3–5 comprise a schematic block diagram showing the major parts of the control section for the printing system shown in FIG. 2;

FIG. 6 is a block diagram of a prior art arrangement of selected components of FIGS. 2 and 3–5 for controlling the transfer of image data from disk drive devices to an image output terminal ("IOT");

FIGS. 7 and 8 are flow diagrams depicting a methodology for constructing a scheduling list for use in an inventive printing technique;

FIG. 9 is a flow diagram depicting a scheduling process for the IOT;

FIG. 10 is a flow diagram depicting a message handling process for the IOT;

FIG. 11 is a flow diagram depicting a scheduling process for an electronic subsystem ("ESS");

FIG. 12 is a flow diagram depicting a message handling process for the ESS;

FIG. 13 is a block diagram of an arrangement for controlling the transfer of image data from disk drive devices to an image output terminal in accordance with the present invention; and FIG. 14 is a flow diagram depicting a scheduling process embodying a methodology in accordance with the present invention.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
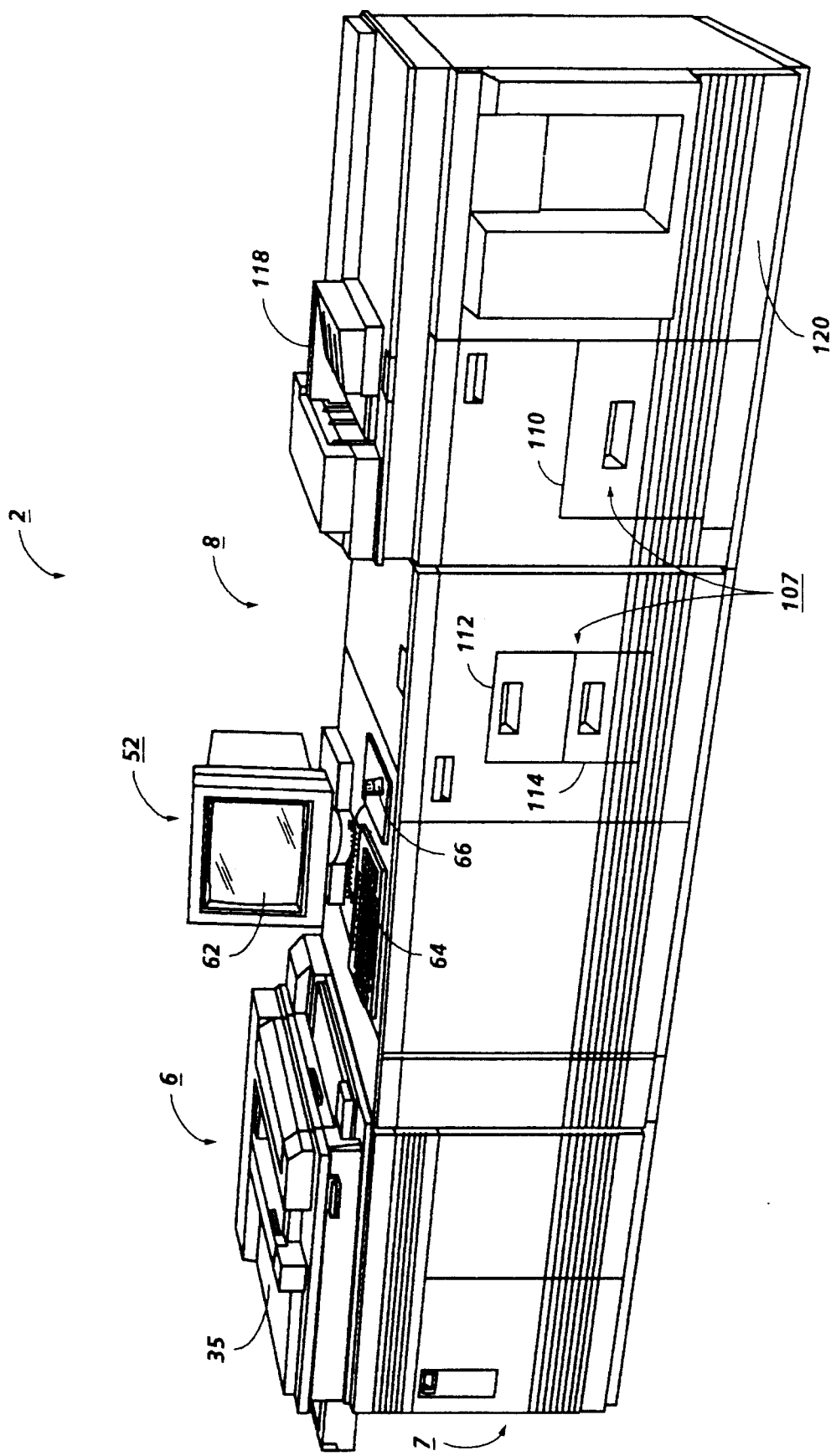
FIG. 1 is a perspective view depicting an electronic printing system of the type adapted to implement the printing technique of the present invention.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned, For on-site image input, section 4 (FIG. 2) has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 122. ROS 87 has a two beam laser with the beams modulated in accordance with the content of an image signal input by acousto-optic modulator to provide dual imaging beams which are scanned across a moving photoreceptor of Print Module 95 by means of a rotating polygon. A detailed description of a print engine suitable for use with the present disclosed preferred embodiment is discussed in U.S. Pat. No. 5170,340, the pertinent portions of which are incorporated herein. As with the print engine of U.S. Pat. No. 5,170,340 the preferred print engine of the present disclosure contemplates the use of a paper path, with a "racetrack" architecture of the type disclosed in U.S. Pat. No. 5,095,342 to Farrell et al., the pertinent portions of which are incorporated herein. It will be appreciated by those skilled in the art that other print engines, besides a laser-based print engine, could be used to implement the preferred embodiment of the present disclosure without affecting the concept upon which such disclosure is based. The preferred print engine exposes two image lines on a photoreceptor with each scan to create latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 122 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multi-processor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point a cursor (not shown) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Referring particularly to FIGS. 3–5, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3–5), PWBs 70 being coupled with one another and with System Memory 61 by a pair of memory buses 72, 74. A memory controller 6 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3, respectively, of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring to FIG. 6, a prior art arrangement, including various components of printing system 2 and the controller 7, is shown in FIGS. 2 and 3–5. In the illustrated embodiment of FIG. 6, a memory, including system memory 61 and disks 90, is shown in communication with a marking manager 130. The system memory 61 includes, among other components, one or more queues 132 and a plurality of buffers 134. The structure and function of the queues 132, which queues serve to group and prioritize various transfers requested by clients, is discussed further in U.S. patent application Ser. No. 08/000,366 filed Jan. 4, 1993, entitled "Dispatching and Scheduling Memory Operations in an Electronic Printing System", the pertinent portions of which are incorporated herein. More particularly, one of the queues 132 is a reserved queue in which print job requests from clients are maintained. The marking manager is associated with a resource manager (FIG. 2), the relationship between the buffers 134 and the resource manager being discussed further in U.S. Pat. No. 5,212,566 to U, the pertinent portions of which are incorporated herein.

The marking manager 130 further communicates with an image output terminal ("IOT") 136, the operation of the IOT being controlled by an IOT manager 138, the details of which will be discussed in further detail below. In one example, the IOT 136 includes the ROS 87 (FIG. 2) coupled with the print module 95, the print module including a photoconductive member with its attendant imaging stations. For a discussion of the detailed structure and operation of the IOT 136 reference can be made to U.S. Pat. No. 5,175,679 to Allen et al., the pertinent portions of which are incorporated herein.

Referring still to FIG. 6, the memory, and more particularly the buffers 134, communicate with the IOT 136 through use of the image generator 86 (FIG. 2). In particular, image data held in the buffers 134 is preferably compressed and the image generator includes a decompression scheme, of the type present in the DocuTech® printing system, for decompressing the compressed data as it is passed to the IOT 136. The image generator 86 is adapted to perform other conventional operations which serve to place the image data in form for printing with the ROS 87.

In operation, a scheduling list, for use in printing a print job with one or more sets, is constructed at one or both of marking manager 130 and IOT manager 138. Preferably, a copy of the scheduling list is maintained at each of the marking manager and the IOT manager. Referring to FIGS. 7 and 8, an exemplary scheme for constructing the scheduling list is shown. More particularly, at step 140, a variable "QuantityLeft" is set to a number corresponding with a number of sets to be printed, and a check, to determine if the list is complete, is provided via step 142. Additionally, at step 144, a variable known as "ImageID", corresponding to the number of images in a given set, is set. Provided that the print job is not a duplex job (step 146), the number of images for a given set is listed by way of steps 148, 150 and 152. As soon as the images for a set are listed, the variable QuantityLeft is decremented (step 153) and the check is performed at step 142 for determining whether any more sets, and thus any more images, require listing.

Reconsidering step 146, if the print job is a duplex job, then the construction scheme proceeds to the procedure of FIG. 8. At step 154, it is decided whether a variable ImageID (see FIG. 7) is even or odd. If the variable is odd, then steps 156 and 158 are performed to force ImageID to an even number. As mentioned above, the IOT preferably includes a "racetrack" which is capable of processing multiple print media sheets at one time. In general terms, the procedure of FIG. 8 includes steps intended to fill the racetrack with first sides of print media sheets (steps 160, 162, 164, 166 and 168) and steps intended to empty the racetrack with second sides (steps 172, 174, 176, 178, and 180). In more specific terms, for the case of a duplex job, to insure that the printer is utilized at maximum productivity, the procedure of FIG. 8 insures that the racetrack is, if possible, always filled with print media sheets. As such, the scheduling list indicates that several print media sheets (the number needed to fill the racetrack) will be printed on one side before the other respective sides of the same sheets are printed. This is why the procedure for scheduling the duplex job puts several even sided images in the list before several odd numbered sides.

Once the scheduling list is constructed, and a copy of the same is provided to each of the marking manager 130 and the IOT manager 138, a print scheduling process is preferably performed with the IOT manager 138 and a prefetch scheduling process with the marking manager 130. Referring to FIG. 9, the print scheduling process is discussed in detail. At step 184, pointers, referred to as "CurrentImage" and "FutureImage" are initialized and, upon requesting an image from the marking manager 130 (step 186), the FutureImage pointer is, at step 188, incremented. Assuming that the pointers are synchronized suitably (step 190), the print scheduling process seeks to schedule another image (step 192). The decision at step 190 will depend on, among other factors: 1) worst time of image transfer from memory (e.g. disk), 2) print enginge speed and 3) amount of prefetch memory available. In terms of the above-mentioned DocuTech® printer, the methodology defined by steps 186, 188 and 190 is referred to as "hinting". More particularly, such methodology permits the IOT to indicate, by way of hints, that it will soon be ready for an image to consume. If a CurrentImage is not committed (at step 194), then, in view of a decision at step 196, either one or more pitches are scheduled (step 198) or a fault is declared (step 200). It should be appreciated that in the case of duplex printing, the commit from the marking manager 130 is critical because once the IOT starts filling up its race track, pitches can no longer be skipped.

Assuming the CurrentImage is committed, a sheet is fed in the IOT (step 204) and a Start Transfer message is communicated from the IOT manager 138 to the marking manager 130. As shown in FIG. 10, and discussed in further detail below, the decision at step 194 is made in view of a signal received from a message handling process associated with the marking manager 130. At step 206, the print scheduling process determines, in view of a signal from the marking manager (refer to discussion of FIG. 10 below) whether image data, corresponding to CurrentImage, has been transferred to the IOT 136. If CurrentImage has been transferred, then the CurrentImage pointer is incremented (step 208) and it is determined, at step 210, whether the end of the scheduling list has been reached. If the transfer does not occur, then a fault is declared at step 200.

Referring to FIG. 10, the methodology for receiving messages, from the message handling process associated with the marking manager 130, is shown. Two messages are shown as being transmitted by the marking manager 130 and received by the message handling process of the IOT manager 138: ImageCommit is transmitted, in response to the Request from the IOT, and indicates that the marking manager will insure that the requested image will be available when the IOT needs it. ImageTransferred is transmitted, in response to the Start Transfer message from the IOT and indicates that the requested image is successfully transferred. More particularly, step 214 serves to determine which kind of signal has been received at the IOT manager. If an ImageCommit signal is received then then step 216 is followed, otherwise, it is determined, at step 218 whether ImageTransferred has been received.

Referring to FIG. 11, the prefetch scheduling process is discussed in detail. At the start of a print job, the marking manager 130 initializes the FutureImage Pointer (step 224) and facilitates the reading of images from the disks 90 to the system memory 61 (also referred to as "prefetch memory"), in response to video hints (i.e. Requests) provided by the IOT manager 138, until the system or prefetch memory is full (steps 226 and 228). It should be noted that maintaining a copy of the scheduling list at the marking manager 130 permits it to work on video hints prior to receiving a video hint signal at the marking manager. The marking manager monitors usage of images in the prefetch memory (step 230) and transfers image data (corresponding to images) in response to Start Transfer messages, provided by the IOT manager. As images are transferred successfully to the IOT 136, further images are read from the disks (steps 232 and 234) until an end of the scheduling list is reached (step 236).

Referring specifically to FIG. 12, an ESS-related process, associated with the marking manager, for handling messages from the IOT, namely the Request and Start Transfer messages, is shown. When a Request message is received (see step 240), an image is transferred to the IOT 136 (steps 242 and 244). At the end of the transfer, the space in which the image was stored is cleared (step 246) and an ImageTransferred message is transmitted, via step 248, to the IOT manager 138. When a Request is received, the ESS-related process determines, at steps 252 and 254, whether the image is resident in the prefetch (system) memory 61. If the image is resident, then an ImageCommit message is transmitted, via step 256, to the IOT manager 138.

Referring again to FIGS. 6–12, an overview of the method for printing a single image is provided. Initially, the IOT-related process transmits a Request message to the marking manager 130 (FIG. 9) and, in turn, the marking manager causes an image to be fetched from the disks 90 (FIG. 11) to one or more of the buffers 134. If the ESS-related process indicates that the image can be placed in the buffers 134 (FIGS. 10 and 12), in a timely manner, then the IOT-related process transmits a Start Transfer message (FIG. 9) to the marking manager. Upon receiving this message (FIG. 12), image data, corresponding to the image is transferred from the system memory 61 to the IOT 136 with the image generator 86 (FIG. 6). If more images are to be printed, further Requests are transmitted to the ESS-related process and the printing methodology is continued. As indicated above, if the marking manager cannot commit to fetching an image for a duplex job, then the process is preferably halted. Further description regarding the operation of the arrangement of FIG. 6 can be found in U.S. patent application Ser. No. 08/010,104 entitled "Apparatus and Method for Managing Memory in a Printing System", filed Jan. 28, 1993, the pertinent portions of which are incorporated herein.

The above-described printing arrangement has been found to function well for its intended purpose. More particularly, the above arrangement functions quite adequately under those circumstances in which memory utilization need not be optimized. Two aspects of such arrangements, however, make it less than optimal, from a cost point of view, when memory is limited. First, in the preferred embodiment of the above-described printing system, copies of the scheduling list are maintained respectively at the ESS (i.e. at the marking manager) and the IOT (i.e. at the IOT manager). In particular, the ESS needs the list so that it can work ahead at locating images on the disks and the IOT needs the list so that it can generate requests. Memory space usage is not optimized when a copy of the list is maintained in two rather than one location. Second, since the printing scheme is accomplished with two managers, rather than one, a messaging arrangement, including an ESS-related process and an IOT-related process, is required. Memory space usage is not optimized when a messaging scheme is required.

Referring to FIGS. 13 and 14, an implementation with a single print controller 260 (FIG. 13) using a prefetch process 262 (FIG. 14) and print process 264 is shown. Essentially, the scheme of FIG. 14 implements the processes of FIGS. 9–12 in a single controller. As will appear, this implementation results in considerable saving of memory space and a particularly efficient approach to print scheduling.

In the illustrated embodiment of FIG. 14, the scheduling list is constructed (step 266) while the CurrentImage pointer and the FutureImage pointer are, via step 268, initialized at a beginning point in the scheduling list. While the prefetch process and the print process are shown as being executed respectively with parallel paths, in preferred practice, the processes would be executed on a single processor in a time shared manner. Referring first to the steps of the prefetch process 262, if space is available in the system (prefetch) memory 61 (step 270) then a selected image in the disks 90 is sought (step 272). Once the selected image is ready for printing (step 274), i.e. the image is found in the disks and it is determined that it can be delivered to the buffers 134 within a selected number of pitches, the variable "FutureImage" is set (step 275) for indicating, to the print process, that the selected image is available for consumption by the IOT 138. Subsequently, the FutureImage pointer is incremented (step 276) and the process proceeds until the end of the scheduling list is reached. As the pointer moves forward, the available images are designated as ready.

Referring next to the steps of the print process 264, if it is time to schedule another image (step 280) and the CurrentImage pointer is pointing to an image that has not been designated by the prefetch process as ready (step 282), then it is determined, at step 284, whether the job is a duplex job. As explained above, if the job is not a duplex job, then skipped pitches can be scheduled (step 286), otherwise the printing system is shutdown (step 288). Assuming, on the other hand, that the CurrentImage pointer is pointing to a selected image that has been designated as ready, then the IOT seeks to print the selected image (step 290), as described above, i.e. the image data, corresponding to the selected image, is transferred from the buffers 134 to the IOT by way of the image generator 86 (FIG. 13). If this image transfer fails (see step 292) then the system is shut down (step 288). If, however, the transfer succeeds, then the buffer space corresponding to the selected image is cleared (step 294) and the CurrentImage pointer is incremented (step 296). The process then continues, using the check of step 298) until the end of the scheduling list is reached.

Numerous features of the above-disclosed embodiment will be appreciated by those skilled in the art. One feature of the disclosed embodiment is that it optimizes memory space usage. First, memory usage is optimized because the scheduling list need only be stored in one place. Second, memory usage is further optimized because messaging processes are not required. Another feature of the disclosed embodiment is that communications overhead, resulting from the employment of messaging processes, is eliminated. Accordingly, inherent unreliability, that may occur as a result of losing messages, is no longer present. Moreover, since no messaging is required, time savings are achieved. Yet another feature of the disclosed embodiment is that it lacks the complexity of the disclosed prior art system. Hence, the disclosed embodiment is relatively easy to construct and relatively low cost. Moreover, since the disclosed embodiment uses a relatively simple algorithm, the amount of processing power required is minimized.

What is claimed is:

1. An apparatus for printing a print job to produce one or more prints with each print including an image represented by image data, comprising:

a scheduling list indicating an order in which images of the print job are to be printed, said scheduling list including image identifiers corresponding respectively with the images of the print job;

an input source for supplying image data representative of the images of the print job;

a first memory section, communicating with said input source for receiving the image data representative of the images supplied by said input source;

a second memory section, communicating with said first memory section, for receiving image data therefrom;

a printer, communicating with said second memory section and said scheduling list, for producing a print of a representation of the image associated with one of the image identifiers; and a unitary print manager, communicating with each of said first memory section, said second memory section, said printer and said scheduling list, for controlling data transfer with respect to each of said first and second memory sections, said unitary print manager implementing, a first process for controlling transmission of the representation of the image corresponding with the one of the image identifiers from said first memory section to said second memory section, said first process positioning an indicator relative to the one of the image identifiers in response to the image data representative of the representation of the image being transmitted from said first memory section to said second memory section, and a second process, combined with said first process, for controlling transmission of the representation of the image corresponding with the one of the image identifiers from said second memory section to said printer, said second process reading said scheduling list, and, in response to detecting that the indicator has been positioned relative to the one of the image identifiers, said second process causing the image data representative of the representation of the image to be transmitted from said second memory section to said printer for producing a print with the representation of the image corresponding with the one of the image identifiers.

2. The apparatus of claim 1, wherein:

space in the second memory section is allocated for the image data representative of the representation of the image;

a determination as to whether additional space is available in the second memory section for image data representative of a representation of another image is made; and the image data representative of the representation of the other image is stored in the second memory section when it is determined that the additional space is available.

3. The apparatus of claim 1, further comprising the steps of:

a first pointer and a second pointer are initialized to point to a beginning of the scheduling list;

the first pointer is incremented when it is determined that image data representative of the representation of the image is resident in the second memory section; and the second pointer is incremented when the image data representative of the representation of the image is transmitted from the second memory section to the printer.

4. The apparatus of claim 1, wherein:

a determination as to whether the representation of the image is associated with a duplex print is made when it is determined that the indicator has not been positioned relative to the one of the image identifiers; and a skipped pitch is scheduled for the printer when the print to be produced is not a duplex print and operation of the printer is halted temporarily when the print to be produced is a duplex print.

5. The apparatus of claim 1, wherein said first memory section comprises nonvolatile memory and said second memory section comprises volatile memory.

6. The apparatus of claim 1, wherein a second indicator is positioned relative to another one of the image identifiers and is repositioned, relative to the other one of the image identifiers, when the image data representative of the representation of the image is transmitted from the second memory section to the printer.

7. The apparatus of claim 6, wherein the one of the image identifiers and the other one of the image identifiers correspond with the same image identifier in said scheduling list.

* * * * *